(12) United States Patent
Kerschbaum (10) Patent No.: US 8,526,603 B2
(45) Date of Patent: Sep. 3, 2013

(54) PUBLIC-KEY ENCRYPTED BLOOM FILTERS WITH APPLICATIONS TO PRIVATE SET INTERSECTION

(75) Inventor: Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 103 days.

(21) Appl. No.: 13/178,680

(22) Filed: Jul. 8, 2011

(65) Prior Publication Data

US 2013/0010950 A1 Jan. 10, 2013

(51) Int. Cl.
*H04K 1/00* (2006.01)

(52) U.S. Cl.
USPC .......................................... 380/30

(58) Field of Classification Search
USPC ................. 380/28, 30, 282; 726/26
See application file for complete search history.

(56) References Cited

U.S. PATENT DOCUMENTS

| | | | | |
|---|---|---|---|---|
| 8,209,761 | B2 * | 6/2012 | Yao | 726/26 |
| 2008/0263674 | A1 * | 10/2008 | Yao | 726/26 |
| 2010/0146299 | A1 * | 6/2010 | Swaminathan et al. | 713/189 |
| 2010/0281269 | A1 * | 11/2010 | Kindarji et al. | 713/182 |

OTHER PUBLICATIONS

Dan Boneh, "Public Key Encryption that Allows PIR Queries", Stanford Department of Computer Science, Feb. 23, 2006.*
Florian Kerschbaum, "Public-key Encrypted Bloom Filter with Applications to Supply Chain Integrity" SAP Research, karlsuche Germany, Jul. 2011.*
Steven M. Bellovin, "Privacy-Enhanced Searches Using Encrypted Bloom Filters" Technical Report CUCS-034-07, 2007.*
Dan Boneh "Public Key Encryption that Allows PIR Queries" Feb. 23, 2006; pp. 1-14, Retrieved Date: Jul. 9, 2013.*
Steven Bellovin et al., "Privacy-Enhanced Searches Using Encrypted Bloom Filters," Cryptology ePrint Archive Report 2004/022, 2004, 16 pages.
Erik-Oliver Blass et al., Tracker: Security and Privacy for RFID-based Supply Chains, Proceedings of the 18th Network and Distributed System Security Symposium, NDSS 2011, Feb. 2011, 20 pages.
Burton H. Bloom, Space/Time Trade-offs in Hash Coding with Allowable Errors, Communication of the ACM, vol. 13, No. 7, Jul. 1970, pp. 422-426.
Manuel Blum et al., "Non-Interactive Zero-Knowledge and Its Applications," Proceedings of the 20th ACM Symposium on Theory of Computing, STOC'88, May 1988, pp. 103-112.
Andrei Broder et al., "Network Applications of Bloom Filters: A Survey," Internet Mathematics, vol. 1, Issue 4, 2004, pp. 485-509.
Jan Camenisch, et al., "Private Intersection of Certified Sets," Proceedings of the International Conference on Financial Cryptography and Data Security, Lecture Notes in Computer Science 5628, pp. 108-127, Feb. 2009.

(Continued)

*Primary Examiner* — Samson Lemma
(74) *Attorney, Agent, or Firm* — Fish & Richardson P.C.

(57) ABSTRACT

Methods, systems, and apparatus, including computer programs encoded on a computer storage medium, for retrieving, from computer-readable memory, a set, the set including a plurality of elements, adding, using a computing device, elements of the set to a Bloom filter, the Bloom filter including a plurality of bits, and encrypting, using the computing device, each bit of the plurality of bits of the Bloom filter to provide an encrypted Bloom filter, encrypting being achieved using homomorphic, public key encryption. Implementations are further directed to performing operations on the encrypted Bloom filter, and performing private set intersection (PSI) using the encrypted Bloom filter.

19 Claims, 6 Drawing Sheets

(56) References Cited

OTHER PUBLICATIONS

D. Dachman-Soled et al., Efficient Robust Private Set Intersection., Proceedings of the 7th International Conference on Applied Cryptography and Network Security, Lecture Notes in Computer Science 5536, pp. 125-142, Jun. 2009.
Emiliano De Cristofaro et al., "Linear-Complexity Private Set Intersection Protocols Secure in Malicious Model," Proceedings of the 16th Annual International Conference on the Theory and Application of Cryptology and Information Security, ASIACRYPT 2010, Lecture Notes in Computer Science 6477, pp. 213-231, Dec. 2010.
Markus Eurich, et al., "The Impact of Perceived Privacy Risks on Organizations' Willingness to Share Item-Level Event Data Across the Supply Chain," Electronic Commerce Research, vol. 10, Issue 3-4, pp. 423-440, Dec. 2010.
Amos Fiat et al., "How to Prove Yourself: Practical Solutions to Identification and Signature Problems," Proceedings of CRYPTO, Lecture Notes in Computer Science 263, pp. 186-194, 1986.
Michael J.. Freedman et al., "Efficient Private Matching and Set Intersection," Proceedings of EUROCRYPT 2004, Lecture Notes in Computer Science 3027, pp. 1-19, May 2004.
Fujitsu, "Fujitsu Develops World's First 64KByte High-Capacity FRAM RFID Tag for Aviation Applications," Press Release, Jan. 9, 2008, retrieved from http://www.fujitsu.com/global/news/pr/archives/month/2008/20080109-01.html, 3 pages.
Craig Gentry, "Fully Homomorphic Encryption using Ideal Lattices," Proceedings of the 41st ACM Symposium on Theory of Computing, STOC'09, May 31-Jun. 2, 2009, pp. 169-178.
Goh, "Secure Indexes," Cryptology ePrint Archive Report 2003/216, 2003, 19 pages.
Oded Goldreich et al., "Proofs that Yield Nothing but Their Validity or All Languages in NP have Zero-Knowledge Proof Systems," Journal of the Association for Computing Machinery, vol. 38, No. 1, Jul. 1991, pp. 691-729.
Shafi. Goldwasser et al., "Probabilistic Encryption," Journal of Computer and Systems Science, vol. 28, No. 2, pp. 270-299, Apr. 1984.
Jens Groth et al., "Sub-Linear Zero-Knowledge Argument for Correctness of a Shuffle," Proceedings of the 27th Annual International Conference on the Theory and Applications of Cryptographic Techniques, EUROCRYPT 2008, Lecture Notes in Computer Science 4965, pp. 379-396, Apr. 2008.
Carmit Hazay et al., "Efficient Protocols for Set Intersection and Pattern Matching with Security Against Malicious and Covert Adversaries," Proceedings of the 5th Conference on Theory of Cryptography, TCC'08, Lecture Notes in Computer Science 4948, pp. 155-175, Mar. 2008.
Florian Kerschbaum et al., "Privacy-Preserving Pattern Matching for Anomaly Detection in RFID Anti-Counterfeiting," Proceedings of the 6th Workshop on Radio Frequency Identification: Security and Privacy Issues, RFIDSec'10, Lecture Notes in Computer Science 6370, pp. 124-137, Jun. 2010.
Lea Kissner et al.,"Privacy-Preserving Set Operations," Proceedings of the 25th Annual International Cryptology Conference, Lecture Notes in Computer Science 3621, pp. 241-257, Aug. 2005.
Mikko Lehtonen et al., "How to Detect Cloned Tags in a Reliable Way from Incomplete RFID Traces," Proceedings of the 2009 IEEE International Conference on RFID, pp. 257-264, Apr. 2009.
Yingjiu Li et al., "Protecting RFID Communications in Supply Chains," Proceedings of the 2nd ACM Symposium on Information, Computer and Communications Security, ASIACCS '07, pp. 234-241, Mar. 2007.
Ryo Nojima et al., "Cryptographically Secure Bloom-Filters," Transactions on Data Privacy 2, pp. 131-139, 2009.
Nina Oertel, "Tracking Based Product Authentication: Catching Intruders in the Supply Chain," Proceedings of the 17th European Conference on Information Systems, ECIS 2009, Jun. 2009, 13 pages.
Khaled Ouafi et al., "Pathchecker: an RFID Application for Tracing Products in Suply-Chains," Proceedings of the 5th Workshop on RFID Security, Jun. 30-Jul. 2, 2009, 14 pages.
Brian L. Santos et al., "RFID in the Supply Chain: Panacea or Pandora's Box?," Communications of the ACM, vol. 51, Issue 10, pp. 127-131, Oct. 2008.
Tomas Sander et al., "Non-Interactive CryptoComputing for NC1," Proceedings of the 40th Symposium on Foundations of Computer Science, FOCS, pp. 554-567, Oct. 1999.
Sanjay Sarma et al., "Radio Frequency Identification and the Electronic Product Code," IEEE Micro, vol. 21, Issue 6, pp. 50-54, Nov./Dec. 2001.
Thorsten Staake et al., "Extending the EPC Network—The Potential of RFID in Anti-Counterfeiting," Proceedings of the 20th ACM Symposium on Applied Computing, SAC'05, pp. 1607-1612, Mar. 2005.
Maxim H. Waldbaum et al., "Using Creativity to Fight a $60 Billion Consumer Problem—Counterfeit Goods," Loyola Chicago Consumer Law Review, vol. 10, No. 1, pp. 88-102, 1998.
Davide Zanetti et al., "Privacy-Preserving Clone Detection for RFID-enabled Supply Chains," Proceedings of the IEEE International Conference on RFID, pp. 37-44, Apr. 2010.
Dan Boneh et al., "Evaluating 2-DNF Formulas on Ciphertexts," Proceedings of the Theory of Cryptography, Second Theory of Cryptography Conference, TCC 2005, Lecture Notes in Computer Science 3378, pp. 325-341, Feb. 2005.
K. Finkenzeller, RFID Handbook: Fundamentals and Applications in Contactless Smart Cards and Identification, John Wiley & Sons, Inc., 2003.
Jonathan Katz et al., "Introduction to Modern Cryptography: Principles and Protocols," Chapman & Hall/CRC Cryptography and Network Security Series, 2007.
Wassim Itani et al., " SinPack: A Security Protocol for Preventing Pollution Attacks in Network-Coded Content Distribution Networks", 2010 IEEE, Dec. 6, 2010, 6 pages.
European Search Report for European Application No. 12004963.0, dated Feb. 21, 2013, 8 pages.

* cited by examiner

PUBLIC-KEY ENCRYPTED BLOOM FILTERS WITH APPLICATIONS TO PRIVATE SET INTERSECTION

BACKGROUND

A Bloom filter is a space-efficient probabilistic data structure that is used to test whether an element is a member of a set. A Bloom filter is provided as a bit array, with each bit set to 0 when the Bloom filter is empty. A plurality of different hash functions are provided, with each hash function mapping, or hashing some set element to one of the array positions with a uniform random distribution. To add an element of a set to the Bloom filter, the element is fed to each of the hash functions to get a plurality of corresponding array positions. Each of the array positions is set to 1. To determine whether an element is in the Bloom filer, the element is again fed to each of the hash functions to re-determine the array positions. If any of the bits at the array positions are equal to 0, the element is not in the set. If all of the bits in the array position are equal to 1, the element is in the set, although false positives are possible.

Private set intersection (PSI) can enable parties, such as a client and a server, to compute the intersection of elements included within their respective sets without disclosing any information about these elements. During this process, the client can learn the intersection of elements within the sets, whereas the server does not learn the intersection of elements within the sets. PSI has many applications and is therefore a fundamental building block for many search-based computing technologies, such as law enforcement systems that search forensic databases storing DNA profiles or supply chain management systems that involve individual parties with various roles. One approach for checking the intersection of elements within two sets is to use Bloom filters. One disadvantage of Bloom filters is confidentiality.

SUMMARY

In general, implementations of the present disclosure are directed to methods including the actions of retrieving, from computer-readable memory, a first set, the first set including a plurality of elements, adding, using a computing device, elements of the first set to a first Bloom filter, the first Bloom filter including a plurality of bits, and encrypting, using the computing device, each bit of the plurality of bits of the first Bloom filter to provide a first encrypted Bloom filter, encrypting being achieved using homomorphic, public key encryption.

In some implementations, actions further include performing an operation on the first encrypted Bloom filter.

In some implementations, the operation includes at least one of element addition to add an element to the first encrypted Bloom filter, element inclusion verification to determine whether an element is present in the first encrypted Bloom filter and comparing content of the first encrypted Bloom filter to content of a second Bloom filter.

In some implementations, the second Bloom filter includes a second encrypted Bloom filter.

In some implementations, actions further include determining indices of the first Bloom filter for the operation, the operation including an addition operation, and, for each bit of the first Bloom filter, setting a bit equal to 1 if the bit is set by the addition operation and randomizing the bit if the bit is not set by the addition operation.

In some implementations, actions further include determining indices of the first Bloom filter corresponding to an element that is potentially present in the first Bloom filter, the operation including a test operation, expanding a ciphertext for each set Bloom filter bit corresponding to the indices to provide an expanded ciphertext, computing a logical AND operation for all set bits using homomorphism, and generating a zero knowledge proof (ZKP) that the expanded ciphertext is a quadratic residue.

In some implementations, the operation is a non-interactive operation such that the operation can be performed without decryption of the first encrypted Bloom filter.

In some implementations, the homomorphic, public key encryption comprises Goldwasser-Micali (GM) encryption.

In some implementations, the homomorphic, public key encryption comprises Boneh, Goh, Nissim (BGN) encryption.

In some implementations, encryption includes generating a public key, private key pair based on a number of hash functions of the first Bloom filter. In some implementations, encryption of the first Bloom filter is achieved using the public key.

In some implementations, actions further include transmitting the first encrypted Bloom filter, receiving, at the computing device, a first encrypted return set, the first encrypted return set being generated based on the first encrypted Bloom filter and a second set, the second set comprising a plurality of elements, decrypting, using the computing device, the first encrypted return set to provide a first return set, and determining an intersection between the first set and the first return set.

In some implementations, the intersection between the first set and the first return set is representative of an intersection between the first set and the second set.

In some implementations, actions further include transmitting the first set, the first Bloom filter and the first encrypted Bloom filter to a trusted third party, receiving a signature from the trusted third party, and transmitting the signature to an entity, the entity being an owner of the second set.

In some implementations, actions further include generating a ZKP based on the first encrypted Bloom filter, and transmitting the ZKP to an entity, the entity being an owner of the second set.

In some implementations, transmitting the first encrypted Bloom filter includes transmitting the first encrypted Bloom filter to a service provider.

In some implementations, the first encrypted return set is generated by the service provider based on the first encrypted Bloom filter and a second encrypted Bloom filter, the second encrypted Bloom filter being provided to the service provider by an entity, the entity being an owner of the second set.

In some implementations, the first encrypted result set is generated based on generating an expanded ciphertext result of the first encrypted Bloom filter, evaluating a test function for each element in the second set and computing an exclusive OR (XOR) operation between the expanded ciphertext result and a result of the test function.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to encrypting Bloom filters for use in applications where confidentiality is of concern. In accordance with the present disclosure, a Bloom filter can be encrypted using homomorphic, public key encryption, such that only the private-key holder (i.e., the entity that encrypted the Bloom filer) can access the data stored in the Bloom filter. In order for the encrypted Bloom filter to be useful in applications, the public-key holder can add elements to the Bloom filter without interaction (e.g., decrypting and re-encrypting the Bloom filer), and the public-key holder can verify the inclusion or exclusion of an element within the encrypted Bloom filter, also without interaction. To achieve this, specific zero-knowledge proofs (ZKPs) are implemented.

The present disclosure also provides for private set intersection (PSI) using encrypted Bloom filter. PSI can enable parties, such as a parties in a supply chain and/or a third party, to compute the intersection of elements included within respective sets without disclosing any information about the elements. During this process, the parties can learn the intersection of elements within the sets, while maintaining data confidentiality. Thus, the privacy of all elements in the sets can remain private. Protocols for PSI implementation can include a plurality of variants that incorporate encrypted Bloom filters as a space-efficient and time-efficient means for checking the inclusion of an element within a set, which can protect a system from malicious parties that can attack the system.

Implementations of the present disclosure will be described within an example context that includes an item that moves between entities within a supply chain. It is appreciated, however, that implementations of the present disclosure are applicable in other contexts. Other example contexts can include database management, network management, and privacy-preserving law enforcement (e.g., a no-fly list that is checked against flight passengers; criminal investigations including database searches).

In the example context, an enterprise uses a supply chain to transform and move a product or service from one or more suppliers (entities, partners or companies) to a customer. The supply chain is a system that can involve various organizations and people inside and outside of the enterprise. Additionally, the supply chain can utilize technologies, activities and information to transform natural resources, raw materials and components from the one or more suppliers into a finished product that can be delivered to a customer.

As the product makes its way through the supply chain, the enterprise may move the product between various suppliers. The suppliers can share product related data along the supply chain. However, the suppliers may want to maintain the confidentiality of information related to the product movement and transformation as the enterprise moves the product between suppliers. This is particularly relevant in an ad hoc supply chain with dynamically changing suppliers. The enterprise can determine the trade-off between the need to share information along the supply chain and the non-proliferation of confidential information to competitors or others outside of the supply chain. Sharing information between suppliers along the supply chain can result in each supplier providing additional services that benefit the manufacture of the product. The sharing of information can also result in manufacturing process optimizations and improvements resulting in reduced manufacturing costs.

In the example context, and for purposes of illustration and clarity, a first supplier can be considered a client (c) and a second supplier can be considered a server (s). In some implementations, discussed in further detail herein, set information is communicated between the client and the server to perform PSI between a client set and a server set. In some implementations, also discussed in further detail herein, a trusted third party (TTP) can support PSI activities by providing authentication services. In some implementations, also discussed in further detail herein, PSI activities can be outsourced to a service provider (SP), where set information is communicated between the client and the service provider and the server and the service provider.

Figure 1:
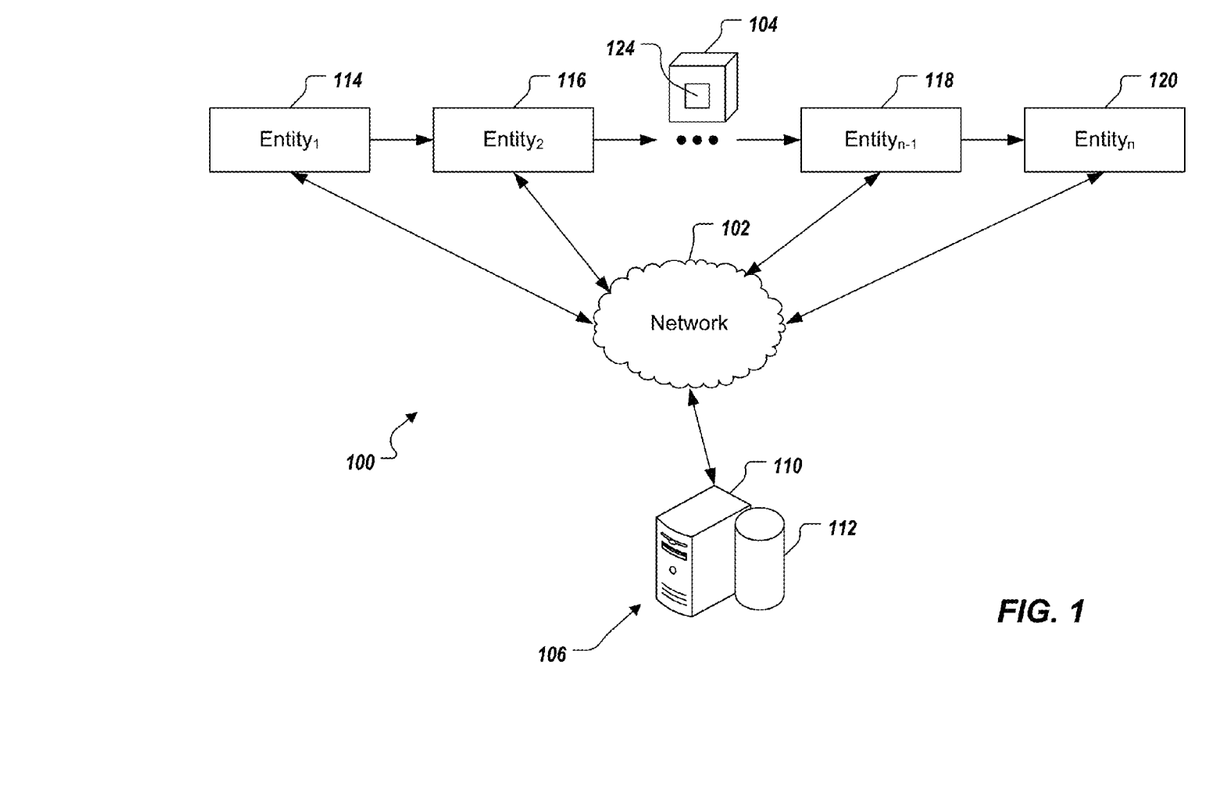
FIG. 1 is a block diagram of an example system architecture that can execute implementations of the present disclosure.

FIG. 1 is a block diagram of an example system 100 that can execute implementations of the present disclosure. The system 100 enables n number of entities (examples of which are entities 114, 116, 118, 120) access, by way of a network 102, to a central computer 106 that includes a central database 112 and a central server 110.

In the example of FIG. 1, an entity (e.g., entities 114, 116, 118, 120) can be a company, partner, organization or supplier located in a supply chain 122. For example, entity 114 is located before entity 116 in the supply chain 122. Entity 118 is located before entity 120 in the supply chain 122. The supply chain 122 manufactures item 104. The item 104 along with any additional components can be introduced to each entity in the supply chain 122 during the manufacturing process. In the example of FIG. 1, the finished item will be output by entity 120 for subsequent delivery to a customer.

In some examples, the item 104 can include an attached machine-readable medium. In the illustrated example, the machine-readable medium includes an RFID tag 124. A unique identification number can be stored on the RFID tag 124 for the item 104. Each entity along the supply chain 122 can generate and associate entity-specific data with the item 104 as it is manufactured, or otherwise processed by the respective entity. The entity-specific data can be associated with the item's unique identification number for storage in a computer-readable medium (e.g., at the respective entities).

In some implementations, the central computer 106 is located at an external service provider. In some implementations, the central computer 106 can be operated by one or more TTPs that provide authentication services, as discussed in further detail herein. In some implementations, the central computer 106 can be operated by one or more SPs that can performs PSI activities, as discussed in further detail herein. For example, the central database 112 may be cloud storage and the central computer 106 may be a cloud computing system hosted by a TTP or an SP. In some implementations, and as discussed in further detail herein, the SP can perform PSI operations, while being oblivious to the underlying data and maintaining the confidentiality thereof.

Figure 2:
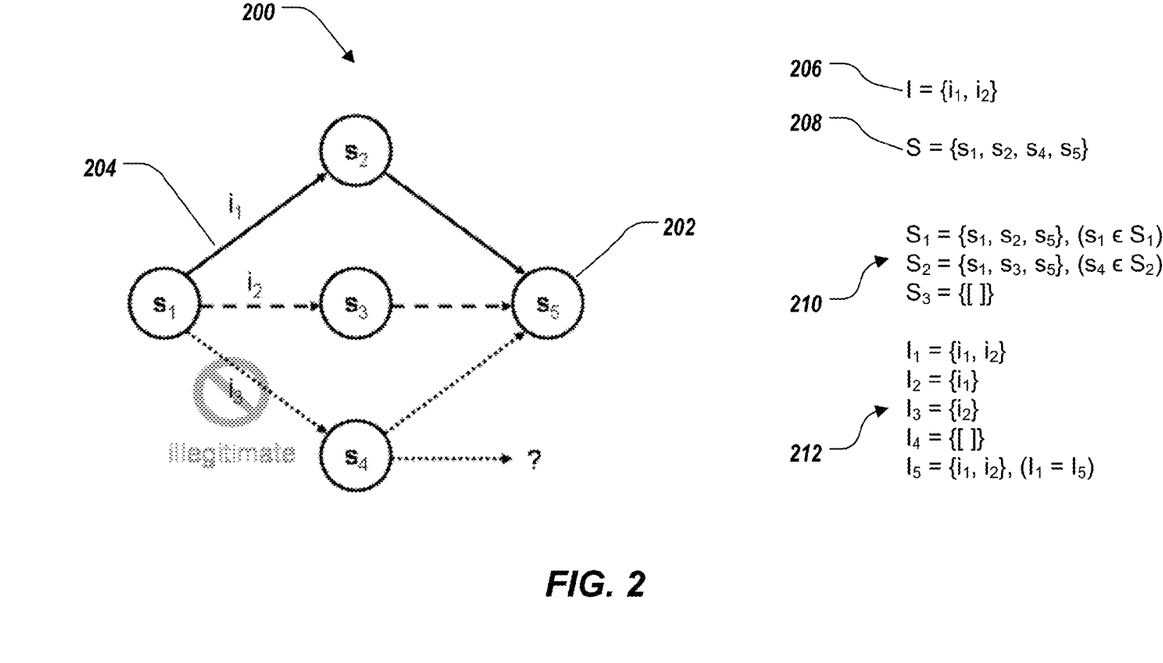
FIG. 2 is a block diagram depicting an example supply chain including an illegitimate item.

Referring now to FIG. 2, a directed graph 200 depicts an example supply chain. Vertices 202 represent suppliers, and the edges 204 represent transportation links between suppliers. In order to check the integrity of a supply chain, while disclosing no information except the validity of operations performed on the supply chain, a generic model for item-level tracking in supply chains can be used. As an item i progresses through the supply chain, it can be handled by a number of different suppliers s. In some implementations, a supply chain includes a plurality of items, where each item has a unique identifier, and a plurality of suppliers, where each supplier has a unique identifier. Let $I=\{i_0, \ldots, i_n\}$ represent a set of items and $S=\{s_0, \ldots, s_m\}$ represent a set of suppliers. As an example, FIG. 2 illustrates a set of items 210, $I=\{i_1, i_2, i_3\}$, and a set of suppliers 212, $S=\{s_1, s_2, s_3, s_4, s_5\}$.

In some implementations, a data structure $d_S$ can be provided, which includes a set 210 of suppliers $S_i$ that handle item i and is transported along with item i as it moves through the supply chain. As an example, FIG. 2 illustrates sets 210 of suppliers $S_1$, $S_2$, and $S_3$ that handle items $i_1$, $i_2$, and $i_3$, respectively. Before a first supplier ships the item to a second supplier, the first supplier adds the second supplier to the data structure $d_S$. In some examples, the transport of $d_S$ can be of an electronic form and included within a network message (e.g., an advanced shipping notification) that accompanies the item as it moves through the supply chain. In some examples, the transport of $d_S$ can be of a tangible form (e.g. an RFID tag) that physically accompanies the item as it moves through the supply chain. Once $d_S$ is provided, many simple, efficient checks can be performed on the supply chain process that transports item i.

In some implementations, a set $S_i$ 210 can be compared against a black list $S_{bl}$ of known violators. These violators, for example, can be companies that engage in undesirable industry practices:

$$\forall s \in S_{bl} \cdot s \notin S_i \quad (1)$$

For example, FIG. 2 illustrates that the set 210 of suppliers $S_2$ handling item $i_2$ should not include supplier $s_4$.

In some implementations, a set $S_i$ 210 can be compared against a white list $S_{wl}$ of mandatory suppliers. These suppliers, for example, can be companies that engage in desirable industry practices:

$$\forall s \in S_{wl} \cdot s \in S_i \quad (2)$$

For example, FIG. 2 illustrates that the set 210 of suppliers $S_1$ handling item $i_1$ should include supplier $s_2$.

In some implementations, a data structure $d_I$ can be provided, which includes the set $I_S$ of items 208 that have been handled by supplier s. Thus, $d_I$ is maintained at one supplier. Each time a supplier handles an item i, the supplier adds the item i to the data structure $d_I$. Once one or more data structures $d_I$ are provided, many simple, efficient checks can be performed on the supply chain process that transports item i.

In some implementations, two data structures $d_{I_{s1}}$ and $d_{I_{s2}}$ at two suppliers $s_1$ and $s_2$, respectively, can be compared to each other to determine whether or not they include the same set $I_s$ 212. If they do include the same set $I_s$, then $I_{s_1}=I_{s_2}$, and there is no inflow or outflow of goods between the two suppliers. As an example, FIG. 2 illustrates sets 212 of suppliers $I_1, I_2, I_3, I_4,$ and $I_5$, where, for example, $I_1=I_5$.

In order to determine an intersection between two sets (i.e., in order to check whether an element is included within a set), two data structures can be compared. A Bloom filter is a data structure that can provide a space-efficient means for performing this operation. If a Bloom filter is unprotected, any individual can check a set for the inclusion of an element and may further be able to learn any or all elements within the set. Consequently, securing the confidentiality of Bloom filter content is an important feature that can be considered in the design of search-based computing technologies, such as a system designed to manage the example supply chain illustrated in FIG. 2, where there could exist a risk of industrial espionage.

Given a data structure, a plurality of parties can be defined for configuring the security properties of the data structure. In some examples, an authority can be defined. The authority controls the data structure and can be the manufacturer of an item or even an independent organization, such as an industry association. In some examples, a supplier can be defined. The supplier can add elements to a set and compare, for example, a set $S_i$ against a black list $S_{bl}$ or a set $I_{s_i}$ to $I_{s_j}$; thus, the supplier participates in the supply chain by handling goods and verifying the integrity of the supply chain.

Generally, implementations of the present disclosure are directed to encrypting Bloom filters, performing one or more operations on the encrypted Bloom filter. Implementations further provide for the use of encrypted Bloom filters to determine an intersection between sets in order to protect a system from malicious parties, such as against malicious suppliers in the case of a supply chain, without distinguishing between malicious suppliers and honest suppliers. In some implementations, it is assumed that all suppliers can be malicious and that all suppliers can perform all operations on the data. In some examples, an attacker can be defined. An attacker can have full control over the network and can read and write any data structure at any example vertex (e.g., vertex 202 illustrated in FIG. 2).

In some implementations, a disruption attack arises when an attacker simply destroys the data structure and thereby disrupts the communication. In order to address disruption attacks, a default decision can be made based on whether an item has proper security checks. In some examples, items without proper security checks can be considered illegitimate. For this case, an attacker disrupting the supply chain cannot insert counterfeit items, but the attacker can perform actions that generate false positives that can result in a disruption of goods supply. In some examples, items without proper security checks can be considered legitimate. This decision can prevent disruptions due to false positives, but counterfeiting problems can still prevail.

In some implementations, a cloning attack arises when an attacker simply copies information from one data structure into another data structure. In some examples, a cloning attack is a common problem for anti-counterfeiting. There are no item-level (on-tag) countermeasures for this case, but given a global data view, prevention is feasible.

In some implementations, the content of a data structure should remain private. Given any data structure d, an attacker should not be able to determine whether or not an element e is in the set (except with negligible probability). Even given several successful checks of inclusion or exclusion for elements $e_i$, or additional successful checks of equality and inequality of sets, an attacker should not be able to determine whether or not an element e' is in the set ($\forall i. e' \neq e_i$).

Furthermore, an attacker should not be able to link a data structure d before or after addition of an element e. Given a pair of data structures $d_0$ and $d_1$, an element e, and a randomly chosen data structure $d_b \in \{d_0 \cup \{e\}, d_1 \cup \{e\}\}$ with the element e added, an attacker should not be able to determine the identity of a random selection b from $d_b$ (except with negligible probability). This prevents an attacker from tracing items through a supply chain and strengthens privacy measures directed to preventing supply chain espionage.

In accordance with implementations of the present disclosure PSI can enable parties, such as a first supplier (referred to as a client) and a second supplier (referred to as a server), to compute the intersection of elements included within respective sets without disclosing any information about these elements and/or the sets (e.g., the sizes of the respective sets). In some implementations, the client can learn the intersection of elements within the sets, whereas the server does not learn the intersection of elements within the sets. Thus, the privacy of all elements not within the intersection can remain private. In some implementations, the size of the client's set may be sensitive information and can also be hidden from the server. In some examples, a client C has a set $\{c_1, \ldots, c_v\}$ of size v, and a server V has a set $\{v_1, \ldots, v_w\}$ of size w. Performing the computation provides the client with the intersection $\{c_1, \ldots, c_v\} \cap \{v_1, \ldots, v_w\}$, but the server does not learn intersection.

PSI implementations provided herein include the use of Bloom filters and homomorphic encryption of each bit of the Bloom filter. In the database community, using Bloom filters has become an established practice for improving the performance of distributed joins in databases. Although Bloom filters allow for false positives when testing set inclusion, but the probability of obtaining a false positive can be reduced to an arbitrarily low probability by using a parameter k (i.e., the number of hash functions used in the Bloom filter). In some examples, a set (e.g., a client set and/or a server set) is added to a respective Bloom filter, and the Bloom filter can be encrypted using homomorphic, public key encryption. Example homomorphic encryption can include Goldwasser Micali (GM) encryption and Boneh, Goh, Nissim (BGN) encryption.

In accordance with the present disclosure, operations can be performed on the encrypted Bloom filters, which can be referred to as ciphertexts. In some implementations, the operations are non-interactive operations, in which the public key holder is not required to decrypt and re-encrypt the Bloom filter. Example operations can include element addition, element inclusion or exclusion verification and filter content comparison (i.e., PSI). In some examples, the Sander Young Yung (SYY) technique can be used to perform operations.

In some implementations, a base PSI, referred to as semi-honest PSI ($PSI_{SH}$) can be provided using encrypted Bloom filters. In some implementations, an authenticated PSI (APSI) can be provided. APSI enables the client to authenticate its set with a TTP. Such authentication prevents the client from obtaining the entire set of the server by including all possible elements within the inputs. Further, the server can verify the authenticity of the data submitted by the client before performing operations in support of PSI. In some implementations, the client can perform a ZKP to maintain full privacy when authentication is not available. Such implementations can be referenced as a malicious PSI model ($PSI_{MAL}$), discussed in further detail herein.

In some implementations, outsourced PSI (OPSI) can be provided. OPSI enables a SP to perform operations in support of PSI based on data provided to the SP from both the client and the server. Within OPSI, privacy is still maintained, because the SP unable to extract any information about the inputs or the intersection. In some examples, the server can store its set at the service provider, and the client can then query the database while the server is off-line.

Protocols for PSI can include a plurality of implementations. In some implementations, a semi-honest model ($PSI_{SH}$) can be utilized, which implements PSI using Bloom filters and homomorphic encryption.

As discussed herein, Bloom filters can be used to provide a space-efficient and time-efficient means for checking the inclusion of an element within a set. An empty Bloom filter b includes m bits (all set to 0), and k hash functions $h_i$, where ($0 \leq i < k$). In some implementations, the hash functions are not required to be random oracles. For the j-th bit of Bloom filter b ($0 \leq j < m$), Bloom filters support the operations Add(x) for addition of an element x of a set to a Bloom filter. and the operation Test(x) can be performed to test the inclusion of element x in the Bloom filter. Performing the operation Create (m) generates a Bloom filter of m bits ($0 \leq j < m$) that are set to 0:

$$\forall j \cdot b_j = 0 \qquad (3)$$

and results in the publishing of k hash functions $f_i$ ($0 \leq i < k$):

$$\forall_i \cdot h_i : \{0,1\}^* \mapsto \{0, \ldots, m-1\} \qquad (4)$$

Performing the operation Add(x) hashes the element x with all k hash functions $h_i$, and the k bits at the resulting indices $g_i$ are set to 1:

$$\forall_i \cdot g_i = h_i(x) \Rightarrow b_{g_i} = 1 \qquad (5)$$

Performing the operation Test(x) hashes the element x with all k hash functions $h_i$, and, if all k bits at the resulting indices $g_i$ are set, then the test function returns 1 (true).

$$\bigwedge_{i=0}^{k-1} b_{h_i(x)} \qquad (6)$$

In some implementations, Bloom filters have a small probability for false positives, i.e., Test(x) may return true even though x has never been added to the Bloom filter. The likelihood of false positives increases as the number of elements added to the set increases. Given the number w of elements to be added and a desired maximum false positive rate $2^{-k}$, the size m of a Bloom filter can be computed as:

$$m = \frac{wk}{\ln 2} \qquad (7)$$

In some implementations, a PSI protocol can be performed by a process including sending a Bloom filter for the client set (bit-wise) encrypted using GM encryption, evaluating the Test function (Equation 6) for each element in the server using the SYY technique, and computing the exclusive-or (XOR) between the expanded ciphertext result and the server's result, and returning the XOR.

In some implementations, GM encryption is used to encrypt bits of the Bloom filter. GM encryption is a public-key, semantically-secure (IND-CPA, indicating that no adversary can distinguish between encryptions of different messages, even when allowed to make encryptions on its own), homomorphic encryption scheme. The plaintext length of the GM encryption is only 1 bit, and it uses the quadratic residuosity modulus, a composite of two large primes p and q. A quadratic residue r is a number such that there exists a number s, where $s^2 = r$ mod n. GM encryption encodes a 1 as a quadratic non-residue and a 0 as a quadratic residue. Particularly, the quadratic non-residues are pseudo-quadratic residues, i.e, their Jacobi symbols are all 1. In some examples, differentiating pseudo-quadratic residues and quadratic residues involves factoring. For a composite of two large primes n=pq and a pseudo quadratic residue v, the public key is n, v and the private key is p and q. To encrypt a 0, a random number r is chosen, and $r^2$ mod n (a quadratic residue) is computed. To encrypt a 1, a random number r is chosen, and $vr^2$ mod n (a quadratic non-residue) is computed.

In some implementations, decryption includes determining whether the encryption is a quadratic residue. The operations can summarized as follows:

KeyGen(k): Given k (a security parameter), generate the private key sk={p, q} and the public key pk={n=pq, v}.
Encrypt (x,pk): Given plaintext x and public key pk, produce ciphertext c.
Decrypt (c,sk): Given ciphertext c and private key sk, produce plaintext x.
Given an encryption E(x) of x under a GM public key pk, multiplying two ciphertexts, e.g., E(x)·E(y), results in an encryption of the XOR, denoted by $\oplus$:

$$E(x) \cdot E(y) = E(x \oplus y) \quad (8)$$

Furthermore, and as noted above, GM encryption is semantically-secure (IND-CPA), i.e., one cannot infer from the ciphertext and the public key whether it is a specific plaintext.

In some implementations, BGN encryption is used to encrypt bits of the Bloom filter, as discussed in further detail below.

The Test function is evaluated (Equation 6) for each element in the set using the SYY technique. The SYY technique operates on GM encryptions and enables the computation of one logical AND operation. One or more logical XOR operations can be performed on the ciphertexts. A ciphertext E(x) is expanded as follows:

Expand (c, pk): Given ciphertext c=E(x) and public key pk, compute $\sigma_i$. This operation is then repeated u times ($0 \leq$<u). For example, flip a random coin $r_i \in \{0,1\}$ (i=1, . . . , u) and set:

$$\sigma_i \leftarrow E(e_i) = \begin{cases} E(x) \cdot E(1) = E(x \oplus 1) & \text{if } r_i = 0 \\ E(0) & \text{if } r_i = 1 \end{cases} \quad (9)$$

The result is a u-length vector $\sigma = \sigma_1, \ldots, \sigma_k$, which is referred to as expanded ciphertext. If x=1, then $x \oplus 1 = 0$, $e_i = 0$, and $\sigma_i = E(0)$ for i=1, . . . , u. Otherwise, if x=0, then $e_i$ is randomly distributed in {0,1}, and $\sigma_i$ is a GM ciphertext of a random bit.

In some implementations, a logical AND of two expanded ciphertexts $\sigma$ (for E(x)) and $\rho$ (for E(y)) can be computed. Denoting $\sigma_i = E(e_i)$ and $\rho_i = E(d_i)$, logical AND can be performed by pair-wise multiplication of the elements of the expanded ciphertext vectors $\tau_i = \sigma_i \cdot \rho_i$. If $x \wedge y = 1$, then $\tau_i = E(c_i) = E(e_i) \cdot E(d_i) = E(e_i \oplus d_i) = E(0 \oplus 0) = E(0)$ for i=1, . . . , u. However, if $x \wedge y = 0$, then $c_i$ remains randomly distributed in {0,1}, since at least one of $e_i$ or $d_i$ is randomly distributed in {0,1}. Therefore, $\tau$ is the expanded ciphertext of $x \wedge y$. In order to decrypt an expanded ciphertext $\tau$, each element $D(\sigma_i) = e_i$ can be decrypted. If $e_i = 0$ for i=1, . . . , u, then the final plaintext is x=1; otherwise, x=0. There is then a $2^{-u}$ probability that it is falsely decrypted as 1, since for an expanded ciphertext $\sigma$ of x=0, the plaintexts $e_i$ are randomly distributed in $\{0,1\}^u$.

In some examples, presenting a root $s(s^2 = r)$ provides a simple method of proving that a ciphertext has plaintext 0. This process can be verified by squaring s, and it is described as zero-knowledge because it does not reveal the secret key p and q. Accordingly, as defined herein, zero-knowledge means that the verifier learns no information about the secret input of the prover. Furthermore, if r is a quadratic non-residue, then no such s exists. For example, given a common input r, n=pq and a prover's secret input p, q, the prover outputs s, and the verifier accepts if $s^2 = r$. Nevertheless, this example cannot be used to prove that a ciphertext has plaintext 1. If the proving party claims that there is no root s, then there is no way for the verifying party to check this.

In some examples, a ZKP can be presented in an interactive form. For example, given a common input r, n=pq and a prover's secret input p, q, the verifier can uniformly choose a random number s and a bit $b \in \{0,1\}$. If b=0, then the verifier sends $s^2$ to the prover. If b=1, then the verifier sends $rs^2$ to the prover. The proving party outputs a guess b' of b and sends a guess s' of s. The verifying party can accept if b'=b and s'=s.

In some implementations, applying a ZKP to an input includes proving three properties: (honest-verifier) zero-knowledge, completeness, and soundness. Zero-knowledge can be verified by simulating the verifier's view from its input and output. As defined herein, completeness means that if r is indeed a quadratic non-residue, then an honest verifier will always accept. For example, if r is a quadratic non-residue, then $rs^2$ is a quadratic non-residue, but $s^2$ is always a quadratic residue. Therefore, the proving party can distinguish the choice b by computing quadratic residuosity. As defined herein, soundness means that if r is not a quadratic non-residue (i.e., $t^2 = r$), then an honest verifying party will reject with high probability. If b=1 and $t^2 = r$, then there exists an s'=st, such that $s'^2 = rs^2$. The message from the verifying party is therefore indistinguishable to the prover for both cases of b, and the probability of a correct guess b' is then at most ½.

In some implementations, this ZKP can be repeated n times in parallel in order to increase the probability for rejecting the ZKP for the case of a quadratic residue. The probability of a false accept is then $2^{-n}$. In some examples, the ZKP can further be rendered non-interactive. Given access to a common random string, the messages from the verifier can be simulated (i.e., the verifier sends a sequence of numbers u). Using s', the correct guess of b by b' can be verified non-interactively. If the verifier sends a quadratic non-residue u (with probability ½), and r is a quadratic residue ($t^2 = r$), then there exists no s', since $ur^{-1}$ is a quadratic non-residue.

In addition to the quadratic residuosity ZKPs, a further ZKP, a shuffle ZKP can be implemented. For a u-length vector $\sigma$ of GM ciphertexts $E(e_i)$, a random permutation $\pi$ for 1, . . . , u, and a u-length vector $\rho$ of GM ciphertexts with plaintext 0, a shuffle $\tau = \pi(\sigma) \cdot \rho$ can be computed, such that given $\sigma$ and $\tau$ (but not the secret key), nothing is revealed about $\pi$. Thus, a shuffle ZKP proves that $\tau$ is indeed a permutation of $\sigma$, i.e., $\pi$ and $\rho$ do exist. For example, given a common input $\sigma$, $\tau$, the prover's secret input is $\pi$, $\rho=(E(0), \ldots)$, such that $\tau=\pi(\sigma)\cdot\rho$. In some examples, a shuffle ZKP has sub-linear communication complexity, which means that fewer than u elements are transmitted.

The XOR between the expanded ciphertext result and the server's element is computed and returned. For a j-th bit of the server's element $s_i$ (denoted as $s_{i,j}$), the expanded ciphertext of the element is:

$$E^l(s_i) = E(s_{i,1}), \ldots, E(S_{i,l}) \qquad (10)$$

The expanded ciphertext can be decrypted bit-wise, and $s_i$ can be reconstructed. The logical AND of fan-in greater than two can be denoted as:

$$\prod_{i=1}^{n} E^l(x_i) = E^l(x_1) \times \ldots \times E^l(x_n) \qquad (11)$$

Figure 3:
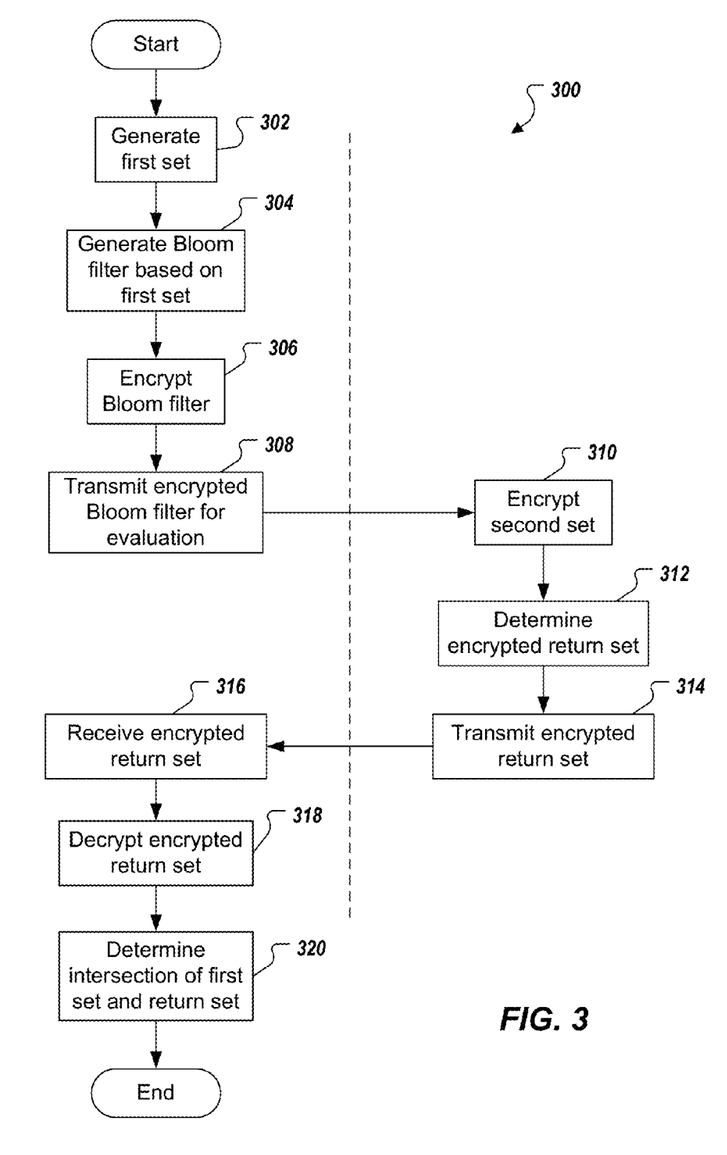
FIG. 3 is a flowchart illustrating an example process that can be executed in accordance with implementations of the present disclosure.

A base implementation (e.g., $PSI_{SH}$) can be described by the following model (discussed in further detail below with reference to FIG. 3):

$C: b = Create(m)$ $i=1, \ldots, v: b.Add(c_i)$ $C \rightarrow S: n, u, E(b_1), \ldots, E(b_m)$ $S: i=1, \ldots, w: E^l(s_i') = E^l(s_i) \times \Pi_{j=0}^{k-1} Expand(E(b_{h_j(s_i)}))$ $S \rightarrow C: E^l(s_1'), \ldots, E^l(s_w')$ $C: \{c_1, \ldots, c_v\} \cap \{s_1', \ldots, s_w'\}$ where C indicates PSI operations performed by the client and S indicates PSI operations performed by the server. In short, the client creates a Bloom filter and adds elements ($c_i$) of the client set ($c=c_1, \ldots, c_v$) to the Bloom filter. The client encrypts the bits of the Bloom filter (e.g., using GM encryption) to provide an encrypted Bloom filter ($E(b)=E(b_1), \ldots E(b_m)$). The server evaluates the Test function for each element ($s_i$) in the server set ($s=s_1, \ldots, s_w$) using the SYY technique, providing an expanded ciphertext result based on the encrypted Bloom filter, and performs the XOR between the expanded ciphertext result and elements in the server set to provide an encrypted return set ($E^l(s_1'), \ldots, E^l(s_w')$). The returned elements $s_1'$ are either elements in the intersection (if all Bloom filter bits are 1, i.e., $\wedge_{j=0}^{k-1} b_{h_j(s_i)}=1$) or are randomly chosen elements in $\{0,1\}^l$. Ideally, the parameter l should be chosen larger than the logarithm of the input domain size because the server's elements are then padded with 0s. The client decrypts the encrypted return set and determines the intersection between the client set and the return set.

In the APSI implementations, the client presents the client set, the Bloom filter and the encrypted Bloom filter, among other data to a TTP, which verifies that the client set is in fact the one used in the PSI protocol. Denoting a signature of x as S(x), the model below exemplifies the interaction between a client, the TTP and the server for APSI:

$C \rightarrow TTP: n, u, c_1, \ldots, c_v, E(b_1), \ldots, E(b_m), b_1, \ldots, b_m, \ldots, r_1, \ldots, r_m$ $TTP: b' = Create(m)$ $i=1, \ldots, v: b'.Add(c_i)$ $i=1, \ldots, m: E(b_i) = u^{b_i} r_i^2$ $TTP \rightarrow C: S(E(b_1), \ldots, E(b_m))$ $C \rightarrow S: E(b_1), \ldots, E(b_m), S(b_1), \ldots, E(b_m))$ The remainder of the APSI implementations parallels that of $PSI_{SH}$, except that the client also submits the signature $S(E(b_1), \ldots, E(b_m))$ to the server for verification during the PSI protocol.

In some examples, the client maintains full privacy, and authentication might not be an option. For this case, the $PSI_{MAL}$ implementation can be used that proves in zero-knowledge that the sender (i.e., the holder of the private key) knows the quadratic residuosity of a number, but does not reveal it during the protocol. If x is a quadratic residue, then $-x$ is a quadratic non-residue, and vice-versa. In some examples, given a common input x, $n=pq$ and a prover's secret input p, q, a ZKP can be applied to x, ZKP(x).

To implement ZKP(x), the proving party (e.g., the client) chooses a random number t and a random sign $\pm$ and sends $y=\pm t^2$ to the verifying party (e.g., the server). The verifying party chooses a random challenge $a \in \{0,1\}$ and sends a to the proving party. If $a=0$, then the proving party sends $z=t$. If $a=1$ and $x=r^2$, then the proving party sends $z=rt$. If $a=1$ and x is a quadratic non-residue, then the proving party computes $r'$ such that $r'^2=-x$ and sends $z=r't$. The verifying party then accepts the proof if $\pm y x^a = z^2$. Thus, for the $PSI_{MAL}$ protocol, the client submits a ZKP for which it already knows the plaintexts for the ciphertexts, and the PSI protocol then begins by implementing:

$C \rightarrow S: n, u, E(b_1), \ldots, E(b_m), ZKP(E(b_1)), \ldots, ZKP(E(b_m))$ That is, the $PSI_{MAL}$ implementation parallels $PSI_{SH}$, except that the client also provides $ZKP(E(b_1)), \ldots, ZKP(E(b_m))$ to the server.

Although the server may not adhere to the prescribed computation, e.g., by returning an encrypted element $E^l(s_i)$ without testing the Bloom filter, it does not attack correctness of the computation. The client locally performs the intersection with its input set. Thus, there is a server in the real model leading to the same output as that generated by the ideal model. In other words, there is no difference between the server choosing s' as an input and the server inserting s' into the result.

With regard to confidentiality of the client, all inputs are encrypted using IND-CPA secure encryption. With regard to confidentiality of the server, the probability of a false positive match between the Bloom filter and an element in the server's set is $2^{-k}+2^{-l}$. The probability of falsely revealing an element by the server is therefore negligible in k or in l. To ensure security against a malicious client or server, it can be shown that for any possible client or server behavior in the real model, there is an input that the client or server provides to the TTP in the ideal model, such that the client or server view in the real protocol can be efficiently simulated from the view in the ideal model.

In some implementations, a simulator $SIM_S$ can be constructed from a malicious real-world server $\hat{S}$. The simulator $SIM_S$ executes KeyGen(k) in the GM encryption and creates a Bloom filter b of all 1s, i.e., $b_i=1$ ($i=1, \ldots, m$). The simulator then sends n, u, $E(b_1), \ldots E(b_m)$ and simulates the signature $S(E(b_1), \ldots, E(b_m))$. After receiving $E^l(s_1'), \ldots, E^l$ from the malicious server $\hat{S}$, the simulator $SIM_S$ decrypts $s_1', \ldots, s_w'$. The simulator $SIM_S$ can now play the role of the ideal server interacting with the TTP (and the ideal client) and submits $s_1', \ldots, s_w'$ to the TTP. Since GM encryption is IND-CPA secure under the factoring assumption, the view of the malicious server $\hat{S}$ in the simulation by $SIM_S$ and that in the real protocol are indistinguishable.

Referring now to the output of an honest client interacting with $\hat{S}$, for each set $s_1', \ldots, s_w'$ received by client C, there is an input set $s_1, \ldots, s_w$ from the server $\hat{S}$. The client builds the intersection $\{c_1, \ldots, c_v\} \cap \{s_1', \ldots, s_w'\}$, and each element $s_i'$ has been used by the simulator in the ideal model such that the outputs are identical.

In some implementations, a simulator $SIM_C$ can be constructed from a malicious real-world client $\hat{C}$. In some examples, the simulator $SIM_C$ can now play the role of the trusted third party T performing the authentication. After receiving n, u, $c_1, \ldots, c_v$, $E(b_1), \ldots, E(b_m)$, $b_1, \ldots, b_m$, the simulator $SIM_C$ performs all ZKP verifications. If any of the verifications fail, then the simulation is aborted. The simulator $SIM_C$ records the set $\mathcal{C} = \{c_1, \ldots, c_v\}$ and returns the signed Bloom filter $S(E(b_1), \ldots, E(b_m))$. In some examples, the simulator $SIM_C$ can now play the role of the real-world server. After receiving $E(b_1), \ldots E(b_m)$, $S(E(b_1), \ldots E(b_m))$, the simulator verifies the signature. If the signature cannot be verified, then the simulation is aborted. In some examples, the simulator $SIM_C$ can now play the role of the ideal client interacting with the TTP (and the ideal server) and submits $\mathcal{C}$. After receiving the intersection $\mathcal{J}$, the simulator $SIM_C$ creates $w-|\mathcal{J}|$ random elements and adds them and the elements within $\mathcal{J}$ to $\mathcal{S} = \{s_1', \ldots, s_w'\}$. It encrypts each bit of each $s_i'$ and sends $E(s_{1,1}'), \ldots, E(s_{w,t}')$ to the client $\hat{C}$. Since the set $\mathcal{C}$ equals the client set $\{c_1, \ldots, c_v\}$, and the set $\mathcal{S}$ only contains the elements in $\mathcal{J}$ and randomly chosen elements, the view of the malicious client $\hat{C}$ in the simulation by $SIM_C$ and that in the real protocol are indistinguishable.

In some implementations, additional data $d_i$ (e.g., a database tuple) is transferred along with a matching element $s_i$. The protocols disclosed herein can be easily extended to accommodate data transfer. Allowing $E_{K_i}(x)$ to denote a symmetric encryption with key $K_i(x)$, the server chooses a random key $K_i(x)$ in the symmetric encryption system for each element $s_i$. It uses the bit-wise expanded ciphertext $E^l(K_i)$ of the key instead of the expanded ciphertext $E^l(S_i)$ of the element in preparing its response and also returns $E_{K_i}(s_i, d_i)$ to the client. The client can now recover the key $K_i$ in case of a match and then recover (decrypt) the element $s_i$ and $d_i$.

GM encryption only uses modular multiplication, and all quadratic residues $r^2$ can be prepared in a pre-computation phase for randomizing the ciphertexts. The client then uses at most vk modular multiplications for encryption. The server expands the ciphertexts and computes the negation (k modular multiplications). The server does not need to randomize each ciphertext in the expanded ciphertext; instead, the server can randomize the ciphertext in the result (1 modular multiplication). The server can compute the product of the expanded ciphertexts and the element (kl+l modular multiplications), and the server can perform this operation for each of its w elements. In summary, this generates vk+w(kl+k+2l) modular multiplications. For example, if k=16 and l=32 are instantiated, then 592w+16v modular multiplications can be achieved.

In some examples, the PSI is efficient if the client set size v is at least one tenth of the server set size w. Furthermore, the computational load on the client using PSI implementations provided herein is significantly smaller and therefore better suitable for computationally weak devices. Furthermore, assuming pre-computation of fixed-base modular exponentiations can become a problem when dealing with multiple protocol instances with different parameters. Ignoring these (as well as pre-computation of quadratic residues) renders the PSI implementations described herein as more efficient if the client set size v is at least 6% of the server set size w.

In some implementations, a public-key encrypted bloom filter (PEBF) can encrypt each bit of a Bloom filter using GM encryption. As further discussed herein, operations can be performed using the PEBF, example operations including PEBF—Create (m,k), PEBF—Add(x), PEBF—Test(x) and PEBF—Compare (E(b')). Each of the example operations is discussed in further detail below.

In some examples, a public-, private-key pair can be created (PEBF—Create(m,k)) in the GM encryption scheme, pk, sk,←KeyGen(k). In some examples, a Bloom filter can be created, $b_j, f_i, \leftarrow$Create(m), and each bit of the Bloom filter can be encrypted, $E(b_j) \leftarrow$Encrypt $(b_j, pk)$. For an element-wise encryption $E(b)$ of $b = (\ldots, b_j, \ldots)$ with public key pk, the public component of the PEBF is $E(b), f_i$, pk, and the private component of the PEBF is sk. A plurality of theorems can then prove that the public component of the PEBF does not reveal any information about the content of the Bloom filter.

In some implementations, a first Theorem 1 can be proven. Let an adversary $\mathcal{A}$ choose two Bloom filter contents $b_0 = (\ldots, b_{0,j}, \ldots)$ and $b_1 = (\ldots, b_{1,j}, \ldots)$. Given a random choice $\beta$ and the public component of a PEBF $E(b_\beta), f_i$, pk, the probability that any adversary $\mathcal{A}$ outputs $\beta$ is at most $$\Pr[\mathcal{A}(b_0, b_1, E(b_\beta), f_i, pk) = \beta] \leq \frac{1}{2} + \frac{1}{\text{poly}(k)} \quad (12)$$

This first theorem can be proven simply. Such an adversary $\mathcal{A}$ would contradict the IND-CPA security of GM encryption; however, a successful adversary against GM encryption can be simulated by embedding the challenge into the challenge of the adversary $\mathcal{A}$.

In order to perform a PEBF—Add(x) operation, the indices of the Bloom filter are computed, $l_i \leftarrow f_i(x)$. Each bit of the Bloom filter can then be recomputed by replacing each bit with a plaintext 1 if the bit is set by the Add(x) operation or re-randomizing if the bit is not set:

$$E(b_j) = \begin{cases} E(1) & \text{if } \exists i \cdot j = l_i \\ E(b_j) \cdot E(0) = E(b_j \oplus 0) & \text{otherwise} \end{cases} \quad (13)$$

Thus, a corollary of Theorem 1 is that the public component of the PEBF does not reveal any information about an added item either before or after the addition.

In some implementations, a Corollary 2 can be proven. Given two public components $E(b), f_i$, pk for the same PEBF, but for Bloom filter contents $b_0 = (\ldots, b_{0,j}, \ldots)$ and $b_1 = (\ldots, b_{1,j}, \ldots)$, such that there exists an index h where $b_{0,h} \neq b_{1,h}$, the probability that any adversary $\mathcal{A}$ outputs h is at most:

$$\Pr[\mathcal{A}(E(b_0), E(b_1), E(b_\beta), f_i, pk) = h] \leq \frac{1}{m} + \frac{1}{\text{poly}(k)} \quad (14)$$

Corollary 2 can then be proven by constructing an adversary $\mathcal{A}^*$ for Theorem 1 by handing both ciphertexts $b_0$ and $b_1$ to adversary $\mathcal{A}$. If $\mathcal{A}$ guesses correctly, then $\mathcal{A}^*$ guesses correctly. Determining whether or not a PEBF contains an element x requires the private key sk.

A PEBF—Test(x) operation is provided to check whether a PEBF contains an element x using the private key sk. A ZKP PEBF—Test$_{true}$ can be constructed that x is contained within the public component of the PEBF: $E(b), f_i$, pk. For a common input x, $E(b), f_i$, pk and prover's secret input sk, the set Bloom filter indices can be computed for x, $l_i \leftarrow f_i(x)$, and the ciphertext for each set Bloom filter bit can be expanded, $\sigma_{l_i} \leftarrow \text{Expand}(E_{l_i}, pk)$. The logical AND of all set Bloom filter bits can further be computed using the homomorphism $\sigma \leftarrow \sigma_{l_1} \cdot \ldots \cdot \sigma_{l_k}$. Thus, this proves in zero-knowledge that $\sigma_j$ ($0 \leq j < u$) is a quadratic residue, Proof-QR ($\sigma_j$).

In some implementations, a Theorem 3 provides that the ZKP PEBF—Test$_{true}$ is a zero-knowledge honest-verifier and that it is complete and sound. Proving Theorem 3 can be achieved by showing a simulator for the view of the verifier. The simulator computes a first three steps and is then invoked u times for Proof-QR($s^2$). The proof reveals that $\sigma_i$ is a quadratic residue and, with high probability, that $E(b_{l_i})$ is a quadratic non-residue, which is also implied by the output of the ZKP.

In some examples, to satisfy the property of completeness, it can be shown that if test(x)=true, then PEBF—Test$_{true}$ is accepted by an honest verifier. For example, if test(x)=true, then $E(b_{l_j})$ is a quadratic non-residue, $\sigma_{l_{i,j}}$ is a quadratic residue, and consequently, all $\sigma_j$ are quadratic residues.

In some examples, to satisfy the property of soundness, it can be shown that if test(x)=false, then PEBF—Test$_{true}$ is rejected by an honest verifier with high probability. For example, if test(x)=false, then there exists an index h ($0 \leq h < k$), such that $l_h = f_h(x)$, and $b_{l_h} = 0$. Then, both $\sigma_{l_{h,j}}$ and $\sigma_j$ are (uniformly) randomly distributed in $\{E(0), E(1)\}$. Thus, at least one ZKP for quadratic residuosity will fail with probability $1-2^{-u}$.

In some implementations, in order to prove that an element x is not contained within a PEBF, it can be proven that at least one index of $\sigma$ has a quadratic non-residue. However, knowing that $\sigma_j$ is a quadratic non-residue may imply (w.h.p.) only that a specific $b_j = 0$. Therefore, it can simply be assumed that the random choices in the Expand( ) operation are such that the ciphertext of only one $E(b_j)$ is used, and that the others are fixed to $E(0)$. Thus, a more complicated ZKP PEBF—Test$_{false}$ can be constructed by implementing the first three steps of the PEBF—Test$_{true}$ test, choosing a random permutation $\pi$ of $(1,\ldots,u)$ and a u-length vector of ciphertexts $\rho = (E(0), \ldots)$, and computing $\tau \leftarrow \pi(\sigma) \cdot \rho$. Further proving in zero-knowledge that $\tau$ is a shuffle of $\sigma$ (Proof-Shuffle ($\sigma, \tau$)) reveals an index h, such that $\tau_h$ is a quadratic non-residue, which can also be proven in zero-knowledge (Proof-QNR ($\tau_h$)).

In some implementations, a Theorem 4 provides that the ZKP PEBF—Test$_{false}$ is a zero-knowledge honest-verifier and that it is complete and sound. The properties of completeness and soundness can be satisfied in an analogous manner as satisfied for the ZKP PEBF—Test$_{true}$. For a zero-knowledge honest-verifier, the following simulator can be provided by uniformly choosing a random h, and for $\tau$ and choosing a random permutation of the ciphertexts for $\sigma$, except for the case of $\tau_h$, for which a plaintext 1 (a quadratic non-residue) should be chosen.

In some examples, a quadratic residue can be replaced at index h by invoking the simulator for Proof-Shuffle($\sigma, \tau$). If the simulator fails, then because a quadratic residue was replaced, the simulator can be rewound and a new h chosen. The choice of h will then fall on a quadratic non-residue with a high probability of ½, and the simulator for Proof-QNR ($\tau_h$) can be invoked.

In some examples, a PEBF—Compare(E(b')) can be implemented by letting E(b') denote the encrypted Bloom filter content for the same hash functions $f_i$. Using the secret key sk, a ZKP PEBF—Compare can be constructed such that b of the public component of a PEBF is equal. For example, for common input E(b'), E(b), pk and prover's secret input sk, the negated, logical XOR of the two encrypted Bloom filter contents can be encrypted using the homomorphism of the encryption scheme:

$$E(b'') \leftarrow E(b) \cdot E(b') \cdot E(1^m) = E(b \oplus b' \oplus 1^m) \tag{15}$$

The ciphertext for each Bloom filter bit ($0 \leq i < m$) can then be expanded, $\sigma_i \leftarrow \text{Expand}(E(b''), pk)$, and the logical AND of the Bloom filter bits can be computed using the homomorphism $\sigma \leftarrow \sigma_0 \cdot \ldots \cdot \sigma_{m-1}$. Thus, it can be proven in zero-knowledge that $\sigma_j (0 \leq j < u)$ is a quadratic residue (Proof-QR($\sigma_j$)).

In some implementations, a Theorem 5 provides that a ZKP PEBF—Compare is a zero-knowledge honest-verifier and that it is complete and sound. Using the same simulator as that used for the ZKP PEBF—Test$_{true}$, the property of completeness can be satisfied by showing that if b=b', then a ZKP PEBF—Compare is accepted by an honest verifier. Thus, if b=b', then b''=$1^m$, and $\sigma$ are all quadratic residues. To satisfy the property of soundness, it can be shown that if b≠b', then ZKP PEBF—Compare will be rejected by an honest verifier with high probability. For example, if b≠b', then b'' contains a 0, and $\sigma$ contains a quadratic non-residue with probability $1-2^{-u}$. Consequently, at least one ZKP Proof-QR($\sigma_j$) will be rejected with high probability. The construction of a ZKP for which b≠b' follows the same process as does a ZKP PEB—Test$_{false}$.

A useful feature of using encrypted Bloom filters for PSI is that the computation can be outsourced to an oblivious SP (i.e., all data including set sizes is completely confidential even though the SP is performing PSI operations), such as in cloud computing (i.e., OPSI). The goal of an oblivious SP (as opposed to a TTP in the ideal model) is to compute one or more encrypted return sets without learning any information about the inputs or the intersection (including its size). In OPSI, the client submits its encrypted Bloom filter E(b) for its set $\{c_1, \ldots, c_v\}$, and the server also submits an encrypted Bloom filter E(b$_i$') for its set $\{s_1, \ldots, s_w\}$. The SP obliviously evaluates the Test function on the ciphertexts as:

$$\bigwedge_{j=1}^{m} \neg (\neg b_j \wedge b'_{i,j}) \tag{16}$$

The multiplicative depth 2 of Equation 16 cannot be evaluated using the SYY technique. Therefore, a new combination of a homomorphic encryption system that can evaluate this formula can be constructed using the BGN encryption, which enables evaluation of one multiplication of fan-in 2 (complementing unbounded addition). After evaluating the first logical AND, the SYY technique can be used to evaluate the second logical AND.

In some implementations, the simplification of the BGN encryption reduces the plaintext domain from $\mathbb{Z}_q$ to $\mathbb{Z}_2$, and it also includes some advantages. In some examples, it is no longer necessary to solve the difficult problem of the discrete logarithm for decryption; instead, simple computations can suffice. In some examples, the private key holder does not need to hold secret the domain of the plaintext. Instead, any party can perform operations (e.g., negation) in the group of the plaintext.

In some examples, the BGN encryption can be understood in terms of cryptographic pairings. Given a security parameter $\kappa$ and two groups $\mathbb{G}_1$ and $\mathbb{G}_2$ of order n=pq for two large primes p and q, where the bit-size of n is determined by $\kappa$, the BGN encryption scheme uses a computable, non-degenerate bilinear map ê: $\mathbb{G}_1 \times \mathbb{G}_1 \to \mathbb{G}_2$. Furthermore, a bilinear pairing satisfies a number of properties. In some examples, bilinearity is satisfied, providing that for g, h∈$\mathbb{G}_i$ and for a, b∈$\mathbb{Z}_n^*$, $\hat{e}(g^a, h^b)=\hat{e}(g,h)^{ab}$. In some examples, non-degenerateness is satisfied, providing that $\hat{e}(g,g)\neq 1$ is a generator of $\mathbb{G}_2$. In some examples, computability is satisfied, providing that there exists an efficient algorithm to compute $\hat{e}(g,h)$ for all g, h∈$\mathbb{G}_1$.

In some implementations, the algorithm of the first stage is encrypted using elements in group $\mathbb{G}_1$. A 0 is encoded as a quadratic residue in $\mathbb{G}_1$, and a 1 is encoded as a pseudo-quadratic residue in $\mathbb{G}_1$. Denoting the encryption of plaintext x as $E_1(x)$ in this first stage and denoting the corresponding decryption as $D_1(c)$, $E_1(x)$ is homomorphic in the XOR operation:

$$D_1(E_1(x) \cdot E_1(y)) = x \oplus y \quad (17)$$

In some implementations, one logical AND operation can be performed on two ciphertexts by using the properties of the bilinear map. Since the result of the bilinear map inherits the exponents, if one operand is a quadratic residue, then the result will be a quadratic residue. The result will either be a quadratic residue or quadratic non-residue in $\mathbb{G}_2$, and a second-stage encryption scheme can follow the GM construction. Denoting the encryption of plaintext x as $E_2(x)$ in the second stage and denoting the corresponding decryption as $D_2(c)$:

$$D_2(\hat{e}(E_1(x), E_1(y))) = x \wedge y \quad (18)$$

Again, the second-stage encryption system is homomorphic in the XOR operation:

$$D_2(E_2(x) \cdot E_2(y)) = x \oplus y \quad (19)$$

The SYY technique can further be applied to the second-stage encryption for unbounded fan-in logical AND. Denoting the expanded ciphertext as $E_2^l(x)$, this combination of homomorphic encryption systems can be used to evaluate the following equation on ciphertexts:

$$D_2^l(E_2^l(x) \times E_2^l(y)) = x \wedge y \quad (20)$$

In some implementations, the IND-CPA security model can be adopted for the BGN construction when the factoring is difficult to perform.

In some implementations of OPSI, both the client and the server send their encrypted inputs to the SP who does not learn any information about either set of inputs or outputs:

$C: b = \text{Create}(m)$ $i = 1, \ldots v: b.\text{Add}(c_i)$ $C \rightarrow SP: n, u, E_1(b_1), \ldots, E_1(b_m)$ $S: i = 1, \ldots, w: b_i' = \text{Create}(m)$ $b_i'.\text{Add}(s_i)$ $S \rightarrow SP: E_1(b_{1,1}'), \ldots, E_1(b_{w,m}'), E_2^l(s_1), \ldots, E_2^l(s_w)$ $P: i = 1, \ldots, w:$ $j = 1, \ldots m: E_2(\neg b_j \wedge b_{i,j}') = \hat{e}(E_1(1) \cdot E_1(b_j), E_1(b_{i,j}'))$ $E_2^l(s_i') = E_2^l(s_i) \times \Pi_{j=1}^m \text{Expand}(E_2(\neg b_j \wedge b_{i,j}') \cdot E_2(1))$ $P \rightarrow C: E_2^l(s_1'), \ldots, E_2^l(s_w')$ In some implementations, the SP also provides an encrypted result set to the server. Some implementations of OPSI are only secure in the semi-honest model. Security against a malicious SP involves verifying the integrity of the computation, which is as complex as performing the computation.

In some examples of OPSI, outsourced computation can be performed independently from the availability of either the client or the server. The client can store an encrypted Bloom filter at the SP, and the server can query new sets or elements as they arrive. In some examples of OPSI, the server can store an encrypted element-wise Bloom filter and bit-wise encrypted elements, and the client can query the SP using a new Bloom filter.

FIG. 3 is a flowchart illustrating an example process 300 that can be executed in accordance with implementations of the present disclosure. In general, the example process 300 can be representative of implementations of $PSI_{SH}$. The example process 300 can be executed using one or more computer program applications executed using one or more computing devices. In some implementations, operations of the example process 300 can be performed by first entity (e.g., a client) and operations can be performed by a second entity (e.g., a server).

A first set is generated (302). For example, the client can generate a first set of elements (e.g., c={$c_1, \ldots, c_v$}). A Bloom filter is generated based on the first set (304). For example, a Bloom filter can be generated and elements of the first set can be added to the Bloom filter using the Add operation. The Bloom filter is encrypted to provide an encrypted Bloom filter (306). In some implementations, each bit of the Bloom filter is encrypted. In some implementations, the Bloom filter is encrypted using GM encryption. In some implementations, the Bloom filter is encrypted using BGN encryption. The encrypted Bloom filter, among other data, is transmitted (308). In the example context of FIG. 3, the encrypted Bloom filter can be transmitted from a computing device of the client to a computing device of the server over a network.

A second data set is encrypted (310). For example, the server can include the second set of elements (e.g., s={$s_1, \ldots, s_w$}). In some implementations, the second set is encrypted using GM encryption. In some implementations, the second set is encrypted using BGN encryption. An encrypted return set is determined (312). For example, the server can perform the Test operation and the SYY technique, as discussed herein, to generate the encrypted return set. An example encrypted return set can include $E^l(s_1'), \ldots, E^l(s_w')$. The encrypted return set is transmitted (314). In the example context of FIG. 3, the encrypted return set can be transmitted from a computing device of the server to a computing device of the client over a network. The encrypted return set is received (e.g., at the client) (316). The encrypted return set is decrypted to provide a return set (318). The intersection of the first set and the second set is determined based on the return set (302).

In some implementations, the example process 300 of FIG. 3 can include operations to support $PST_{MAL}$. In some implementations, a ZKP of the encrypted Bloom filter can be generated. The ZKP of the encrypted Bloom filter can be transmitted with the encrypted Bloom filter to the server (308).

Figure 4:
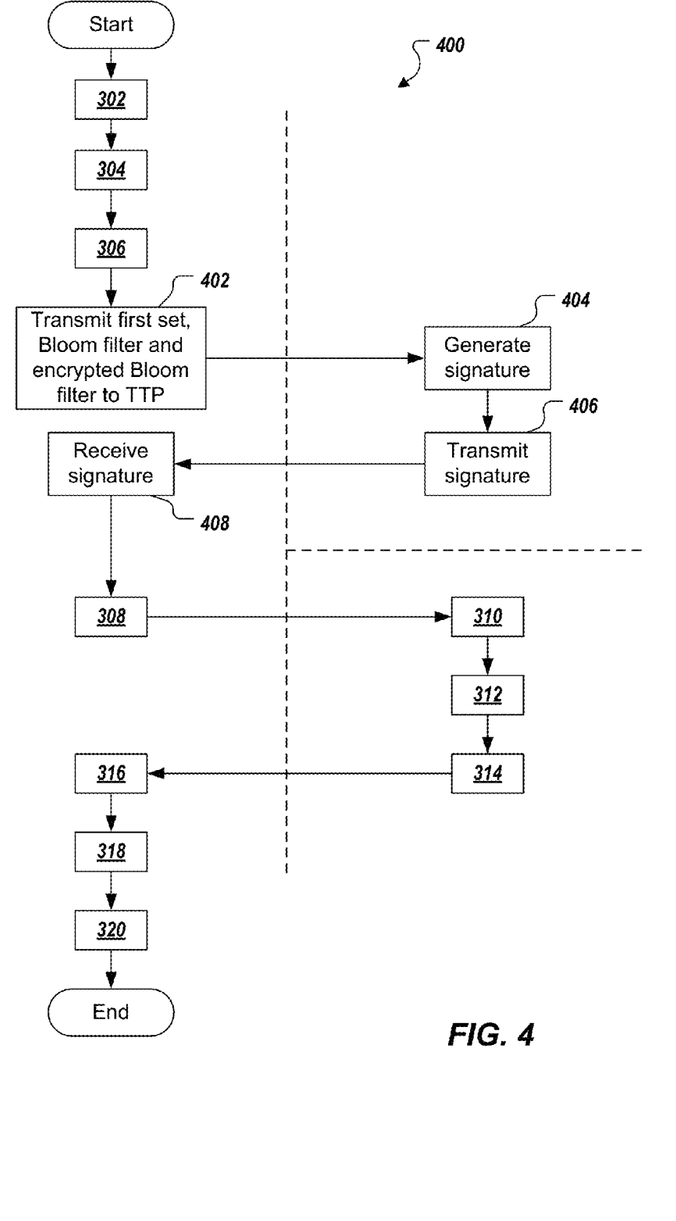
FIG. 4 is a flowchart illustrating an example process that can be executed in accordance with implementations of the present disclosure.

FIG. 4 is a flowchart illustrating an example process 400 that can be executed in accordance with implementations of the present disclosure. In general, the example process 400 can be representative of implementations of APSI and includes the operations of the example process 300 discussed in detail above with reference to FIG. 3. The example process 400 can be executed using one or more computer program applications executed using one or more computing devices. In some implementations, operations of the example processes 300, 400 can be performed by first entity (e.g., a client), operations can be performed by a second entity (e.g., a server), and operations can be performed by a TTP.

The first set, the Bloom filter and the encrypted Bloom filter are transmitted to the TTP (402). The TTP processes the first set, the Bloom filter and the encrypted Bloom filter and generates a signature corresponding to the encrypted Bloom filter (e.g., $S(E(b_1), \ldots, E(b_m))$) (404). The TTP transmits the signature to the client (406). The client receives the signature (408). The client transmits the signature and the encrypted Bloom filter (308), as discussed above with reference to FIG. 3.

Figure 5:
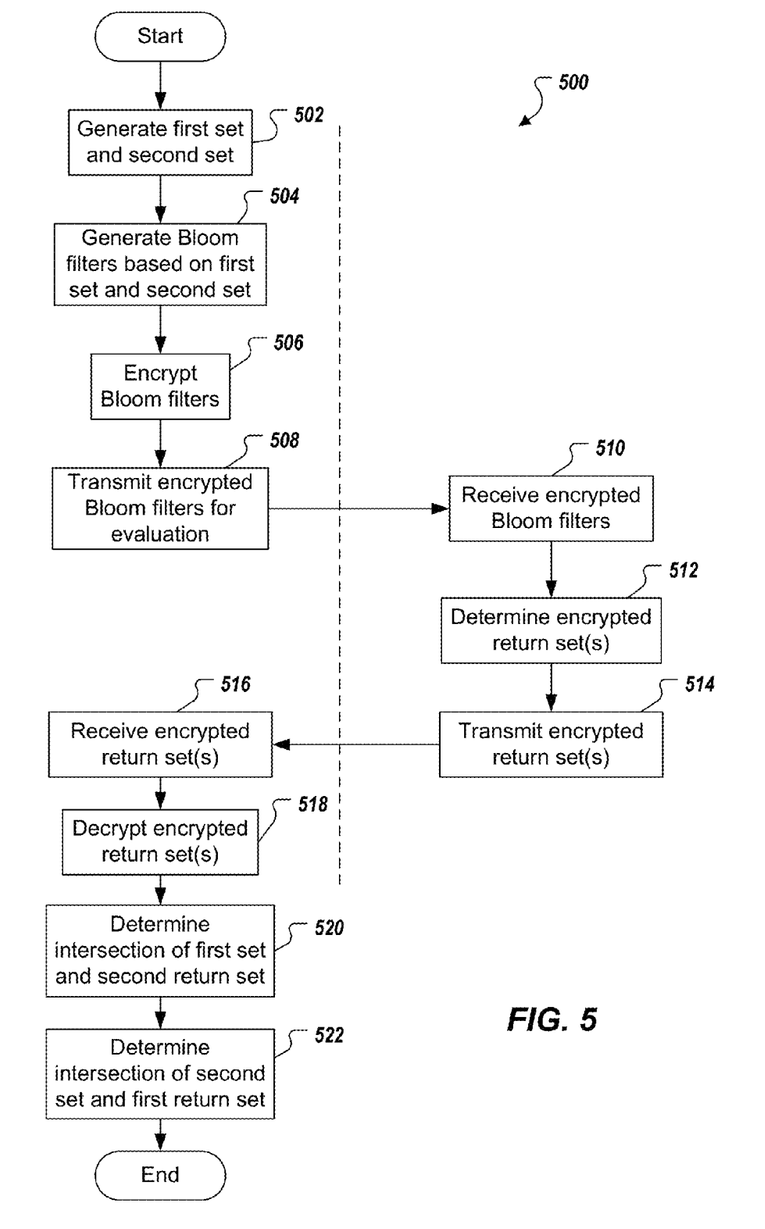
FIG. 5 is a flowchart illustrating an example process that can be executed in accordance with implementations of the present disclosure.

FIG. 5 is a flowchart illustrating an example process 500 that can be executed in accordance with implementations of the present disclosure. In general, the example process 500 can be representative of implementations of OPSI. The example process 500 can be executed using one or more computer program applications executed using one or more computing devices. In some implementations, operations of the example process 500 can be performed by first entity (e.g., a client), operations can be performed by a second entity (e.g., a server), and operations can be performed by a SP.

A first set and a second set are generated (502). For example, the client can generate a first set of elements (e.g., $c=\{c_1, \ldots, c_v\}$), and the server can generate a second set of elements (e.g., $s=\{s_1, \ldots, s_w\}$). A first Bloom filter is generated based on the first set and a second Bloom filter is generated based on the second set (504). For example, the first Bloom filter can be generated by the client and elements of the first set can be added to the Bloom filter using the Add operation, and the second Bloom filter can be generated by the server and elements of the second set can be added to the second Bloom filter using the Add operation. The first and second Bloom filters are encrypted to provide respective first and second encrypted Bloom filters (506). In some implementations, each bit of the first Bloom filter is encrypted by the client and each bit of the second Bloom filter is encrypted by the server. In some implementations, the Bloom filters are encrypted using BGN encryption. The first and second encrypted Bloom filters, among other data, are transmitted (508). In the example context of FIG. 5, the first encrypted Bloom filter can be transmitted from a computing device of the client to a computing device of the SP, and the second encrypted Bloom filter can be transmitted from a computing device of the server to the computing device of the SP.

The first and second Bloom filters are received (510). An encrypted return set is determined (512). For example, the SP can perform the Test operation and the SYY technique, as discussed herein, to generate the encrypted return set. In some examples, a first encrypted return set and a second encrypted return set can be determined. For example, each of the first encrypted return set and the second return set can be determined based on the first encrypted Bloom filter and the second encrypted Bloom filter. An example first encrypted return set can include $E_2^l(s_1'), \ldots, E^l(s_v')$. An example second encrypted return set can include $E_2^l(s_1'), \ldots, E^l(s_w')$. The first and second encrypted return sets are transmitted (514). In the example context of FIG. 5, the first encrypted return set can be transmitted from a computing device of the SP to a computing device of the server over a network, and the second encrypted return set can be transmitted from the computing device of the SP to a computing device of the client over the network. The first and second encrypted return sets are received (e.g., at the server and the client, respectively) (516). The first and second encrypted return sets are decrypted to provide respective first and second return sets (518). The intersection of the first set and the second set is determined based on the second return set (520) (e.g., the client determines the intersection). The intersection of the second set and the first set is determined based on the first return set (522) (e.g., the server determines the intersection).

Implementations of the present disclosure provide a number of advantages. In some examples, advantages are achieved as a combination of security and performance advantages. In some implementations, the $PSI_{MAL}$ and APSI implementations are provably secure in the malicious model. In some examples, these implementations operate with minimal trust assumptions, which means that they are secure in the standard model (without random oracles). Cryptographic assumptions for these variants include that factoring is difficult to perform, which is one of the weakest assumptions that can be made. In some examples, the $PSI_{MAL}$ and APSI implementations are client set size-hiding (i.e., they do not reveal the size of the client's set). In some examples, the APSI implementation uses authenticated client sets, which means that the client authenticates its set with a TTP who certifies that it adheres to some policy. This prevents the client from "stealing" the server's input by submitting a set with all possible elements as its input.

In some implementations, improved efficiency is provided. For example, the PSI and APSI implementations have linear complexity ($O(k(v+w))$). In some examples, the OPSI implementation has quadratic complexity $O(kw^2)$. In some examples, the PSI and APSI implementations use inexpensive operations (in terms of processing power required to perform). They do not use modular exponentiations or full-domain hash functions; instead, they only use modular multiplications. In some examples, the APSI implementation uses a similar (absolute) number of normalized modular multiplications as the most efficient, linear-complexity protocols. Nevertheless, this implementation does not use full-domain hashing and still uses much less pre-computation.

In some implementations, improved operation is exhibited in that PSI can be outsourced to an oblivious SP, where both the client and the server submit encrypted input, and the SP performs the computation obliviously without learning anything about the input (including the client set size) and the intersection (including its size). In some examples, the computation can be performed independently, i.e., either the client or the server store their (encrypted) input at the service provider and the other party can query with its input at any time when required.

Figure 6:
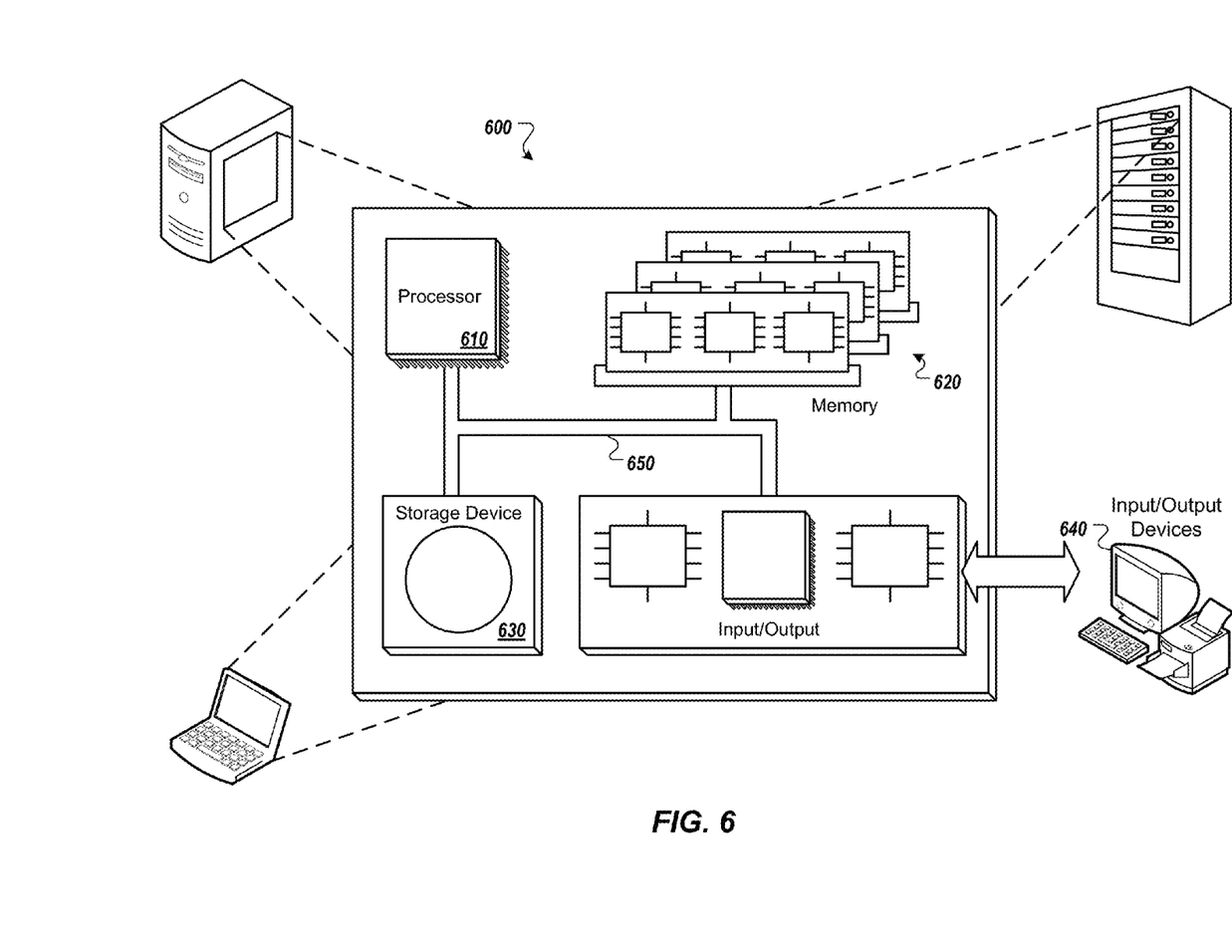
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, comprising:
retrieving, from computer-readable memory, a first set, the first set comprising a plurality of elements;
adding, using a computing device of a first entity, elements of the first set to a first Bloom filter, the first Bloom filter comprising a plurality of bits;
encrypting, using the computing device, each bit of the plurality of bits of the first Bloom filter to provide a first encrypted Bloom filter, encrypting being achieved using homomorphic, public key encryption; and
transmitting, to a computing device of an entity, the first encrypted Bloom filter, the entity performing an operation on the first encrypted Bloom filter.

2. The method of claim 1, wherein the operation comprises at least one of element addition to add an element to the first encrypted Bloom filter, element inclusion verification to determine whether an element is present in the first encrypted Bloom filter and comparing content of the first encrypted Bloom filter to content of a second Bloom filter.

3. The method of claim 2, wherein the second Bloom filter comprises a second encrypted Bloom filter.

4. The method of claim 1, further comprising:
determining indices of the first Bloom filter for the operation, the operation comprising an addition operation; and
for each bit of the first Bloom filter, setting a bit equal to 1 if the bit is set by the addition operation and randomizing the bit if the bit is not set by the addition operation.

5. The method of claim 1, further comprising:
determining indices of the first Bloom filter corresponding to an element that is potentially present in the first Bloom filter, the operation comprising a test operation;
expanding a ciphertext for each set Bloom filter bit corresponding to the indices to provide an expanded ciphertext;
computing a logical AND operation for all set bits using homomorphism; and
generating a zero knowledge proof (ZKP) that the expanded ciphertext is a quadratic residue.

6. The method of claim 1, wherein the operation is a non-interactive operation such that the operation can be performed without decryption of the first encrypted Bloom filter.

7. The method of claim 1, wherein the homomorphic, public key encryption comprises Goldwasser-Micali (GM) encryption.

8. The method of claim 1, wherein the homomorphic, public key encryption comprises Boneh, Goh, Nissim (BGN) encryption.

9. The method of claim 1, wherein encryption comprises generating a public key, private key pair based on a number of hash functions of the first Bloom filter.

10. The method of claim 9, wherein encryption of the first Bloom filter is achieved using the public key.

11. The method of claim 1, further comprising:
receiving, at the computing device of the first entity, a first encrypted return set, the first encrypted return set being generated based on the first encrypted Bloom filter and a second set, the second set comprising a plurality of elements;
decrypting, using the computing device, the first encrypted return set to provide a first return set; and
determining an intersection between the first set and the first return set.

12. The method of claim 11, wherein the intersection between the first set and the first return set is representative of an intersection between the first set and the second set.

13. The method of claim 11, further comprising:
transmitting the first set, the first Bloom filter and the first encrypted Bloom filter to a trusted third party, the entity comprising the trusted third party;
receiving a signature from the trusted third party; and
transmitting the signature to a second entity, second the entity being an owner of the second set.

14. The method of claim 11, further comprising:
generating a zero-knowledge proof (ZKP) based on the first encrypted Bloom filter; and
transmitting the ZKP to a second entity, the second entity being an owner of the second set.

15. The method of claim 11, wherein transmitting the first encrypted Bloom filter comprises transmitting the first encrypted Bloom filter to a service provider, the entity comprising the service provider.

16. The method of claim 15, wherein the first encrypted return set is generated by the service provider based on the first encrypted Bloom filter and a second encrypted Bloom filter, the second encrypted Bloom filter being provided to the service provider by a second entity, the second entity being an owner of the second set.

17. The method of claim 11, wherein the first encrypted result set is generated based on generating an expanded ciphertext result of the first encrypted Bloom filter, evaluating a test function for each element in the second set and computing an exclusive OR (XOR) operation between the expanded ciphertext result and a result of the test function.

18. A non-transitory computer-readable storage medium coupled to one or more processors having instructions stored thereon which, when executed by the one or more processors, cause the one or more processors to perform operations comprising:
retrieving, from computer-readable memory, a first set, the first set comprising a plurality of elements;
adding, using a computing device of a first entity, elements of the first set to a first Bloom filter, the first Bloom filter comprising a plurality of bits;
encrypting, using the computing device, each bit of the plurality of bits of the first Bloom filter to provide a first encrypted Bloom filter, encrypting being achieved using homomorphic, public key encryption; and
transmitting, to a computing device of an entity, the first encrypted Bloom filter, the entity performing an operation on the first encrypted Bloom filter.

19. A system, comprising:
one or more computers associated with a first entity; and
a computer-readable medium coupled to the one or more computers having instructions stored thereon which, when executed by the one or more computers, cause the one or more computers to perform operations comprising:
retrieving, from computer-readable memory, a first set, the first set comprising a plurality of elements;
adding elements of the first set to a first Bloom filter, the first Bloom filter comprising a plurality of bits;
encrypting each bit of the plurality of bits of the first Bloom filter to provide a first encrypted Bloom filter, encrypting being achieved using homomorphic, public key encryption; and
transmitting, to a computing device of an entity, the first encrypted Bloom filter, the entity performing an operation on the first encrypted Bloom filter.

* * * * *